INVENTOR.
Harold D. Morris
BY Philip G. Leigh
Attorneys

INVENTOR.
Harold D. Morris
Philip G. Leigh
BY
Attorneys

INVENTOR.
Harold D. Morris
Philip G. Leigh
BY
Flehr, Hohbach, Test,
Albritton & Herbert
Attorneys

United States Patent Office 3,553,555
Patented Jan. 5, 1971

3,553,555
ELECTRIC MOTOR SPEED CONTROL APPARATUS, SYSTEM AND METHOD
Harold D. Morris, Orinda, and Philip G. Leigh, Oakland, Calif., assignors to Systron-Donner Corp., Concord, Calif., a corporation of California
Filed June 27, 1967, Ser. No. 649,182
Int. Cl. H02p 5/16
U.S. Cl. 318—314                                         5 Claims

ABSTRACT OF THE DISCLOSURE

Speed control apparatus consisting of a motor in which the rotor rotates precisely in synchronism with a predetermined or commanded frequency by automatic synchronization of shaft rotation through use of a digital phase-locked speed control. A pulse signal generated by the motor is compared with a reference pulse signal to produce an error signal which controls power to the motor. For stabilization, the error signal may be modified by the integral of an angular acceleration feedback signal.

BACKGROUND OF THE INVENTION

This invention relates to a synchronous speed control apparatus, system and method. In the past, many attempts have been made to provide means for controlling the speed of motors and, in particular, to cause the motors to operate at a predetermined or synchronous speed. With such systems, it has been necessary to monitor the frequency of the motor to determine whether or not it is operating at the desired speed because there was no means to ensure that the motor was operating at the proper speed. This is undesirable because of the inaccuracy of such measurements and also because of the length of time required for such measurements.

SUMMARY OF THE INVENTION

The speed control apparatus consists of a motor which has a rotating shaft with a rotor carried on the rotating shaft. At least one power winding and an excitation winding are provided. One of the windings is carried by the rotor. Means is provided for sensing the speed of rotation of the shaft and for producing an integer number of pulses per revolution of the shaft. Means is provided which produces a reference signal comprised of pulses having a repetition rate representing the desired shaft speed for the motor. Comparison means compares the pulses representing the speed of the shaft with the pulses representing the desired shaft speed and produces a command signal. The command signal is utilized for producing a torque which is proportional to the command signal and which represents the difference between the desired shaft speed and the actual shaft speed of the motor which is supplied to the excitation winding.

In general, it is an object of the present invention to provide a speed control apparatus, system and method which provides synchronous speed control for motors.

Another object of the invention is to provide an apparatus, system and method of the above character in which the motor shaft is driven in synchronism with a reference frequency.

Another object of the invention is to provide an apparatus, system and method of the above character in which a large number of discrete settings of speed for the motor can be provided.

Another object of the invention is to provide an apparatus, system and method of the above character in which the speed of the motor can be rapidly changed from one speed to another.

Another object of the invention is to provide an apparatus, system and method of the above character which is particularly useful for squirrel cage induction motors.

Another object of the invention is to provide an apparatus, system and method of the above character which is relatively simple and inexpensive.

Another object of the invention is to provide a speed control apparatus, system and method of the above character which is particularly useful for centrifuges.

Additional objects and features of the invention will appear from the following description in which the preferred embodiments are set forth in detail in conjunction with the accompanying drawings.

DESCRIPTION OF THE PREFERRED EMBODIMENTS

Figure 1:
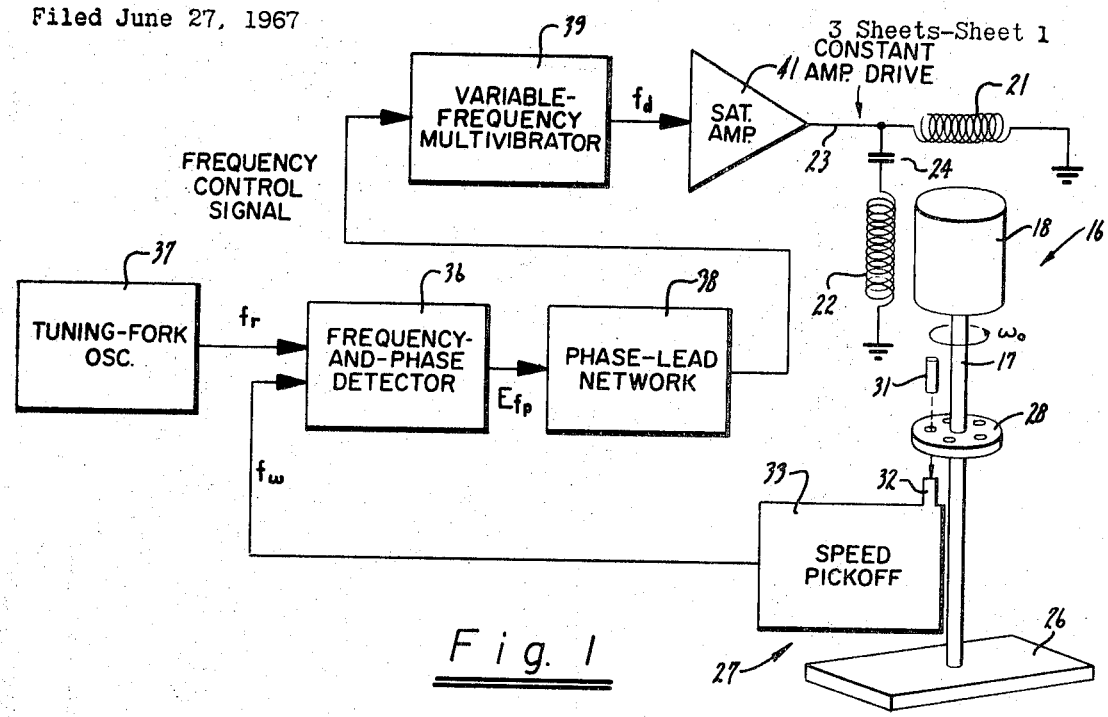
FIG. 1 is a block diagram with certain parts schematically illustrated of an apparatus and system incorporating the present invention utilizing frequency control of the motor drive.

The apparatus and system shown in FIG. 1 consists of a motor 16 of a conventional type. Thus, it is provided with a rotating shaft 17 which carries a rotor 18. The motor is provided with at least one power winding and a multi-phase excitation winding. As is well known to those skilled in the art, either the power winding or the excitation winding can be mounted on the rotor. If it is assumed that the motor 16 shown in FIG. 1 is a squirrel cage motor, the power windings are mounted upon the rotor and take the form of conducting bars (not shown) carried by the rotor. The multi-phase excitation windings are provided by two phase motor windings 21 and 22, both of which have one end connected to ground and the other ends of which are connected to an input terminal 23. The winding 22 is connected to the input terminal 23 through a capacitor 24.

The motor 16 is normally provided for driving a load which is represented by the mass 26 secured to the shaft 17.

Means 27 is provided for sensing the speed of the shaft 177 and can take any suitable form which will provide a reliable signal composed of pulses in which an integer number of pulses is produced for each revolution of the shaft. Thus, as shown in the drawings, the shaft speed measuring means 27 can consist of a disc 28 secured to the shaft and which rotates with the shaft. The disc 28 is provided with a desired number of holes as, for example, five shown in the drawing. A source of light represented by the lamp 31 is provided on one side of the disc, whereas light sensing means 32 disposed on the other side of the disc and adapted to see light from the light source 31 as it passes through the holes 28 as the shaft 17 is rotated, is provided in conjunction with speed pick-off means 33. The speed pick-off means 33 is of a conventional type and produces a pulse train in which the number of pulses represents and is proportional to the revolutions of the shaft 17. Specifically, the number of pulses per second in the pulse train is equal to an integer times the speed of rotation of the shaft 17. This signal or pulse train is identified as $f_w$ and is supplied to a frequency-and-phase detector 36. A pulse train $f_r$ is also supplied to another input of the frequency-and-phase detector 36. The pulse train $f_r$ is produced by an oscillator 37 of a suitable type such as a tuning fork oscillator and serves as means for producing a reference signal which is comprised of a plurality of pulses which have a repetition rate which represents and is proportional to the desired shaft speed for the motor 16. As in the pulse train $f_w$, the number of pulses per second in the pulse train is an integer times the desired shaft speed in which the integer is the same integer as used in the pulse train $f_r$.

The frequency-and-phase detector 36 serves as comparison means which compares the pulse train $f_w$ representing the speed of the shaft with the pulse train $f_r$ representing the desired shaft speed and produces a command or error signal $E_{fp}$ which is supplied to a phase lead network 38 which is utilized for a purpose hereinafter described. The output from the phase lead network 38 can be characterized as a frequency control signal which is supplied to a variable frequency multivibrator 39 that operates in a free running mode and provides an output in the form of a squarewave driving signal which is supplied to a saturating amplifier 41. The output of the saturating amplifier 41 is supplied to the input terminal 23 of the motor 16 and to the excitation windings 21 and 22.

Figure 2:
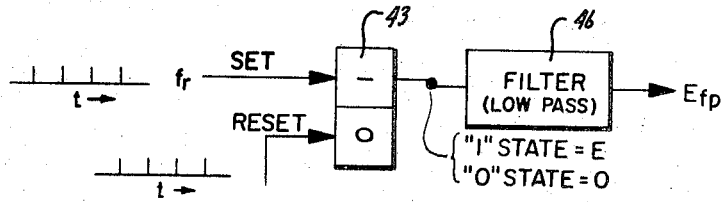
FIG. 2 is a block diagram showing one type of frequency and phase detector which could be utilized in FIG. 1.

All the components utilized in the system shown in FIG. 1 are conventional with the exception of the frequency-and-phase detector 36. A frequency-and-phase detector which could be utilized in the system shown in FIG. 1 is shown in FIG. 2 and consists of a flip-flop 43 in which the set or "1" side is driven by the pulse train $f_r$ and the reset or "0" side is driven by the pulse train $f_w$. As is well known to those skilled in the art, the flip-flop has two possible states which are normally characterized as the "1" state and the "0" state. The output from the "1" side of the flip-flop 43 is supplied to a low pass filter 46 which provides the output $E_{fp}$ which is supplied to the phase lead network 38 shown in FIG. 1.

Operation of the speed control apparatus and system in performing the method may now be briefly described as follows. Let it be assumed that the motor 16 is in the zero speed condition which would mean that the disc 28 would not be rotating and the speed pick-off means 33 would not be producing any output pulses. The output from the speed pick-off means would be essentially zero frequency which would be supplied to the frequency-and-phase detector 36. At the same time, the output from the tuning fork oscillator 37 is being supplied to the frequency-and-phase detector 36. This would mean that the flip-flop 43 of the frequency-and-phase detector 36 would remain in the set condition to supply a maximum output from the filter 46 through the phase-lead network 38 to supply a maximum frequency D-C control signal to the multivibrator 39. The multivibrator produces a squarewave output signal of a constant emplitude but varying frequency determined by the control signal supplied to the multivibrator 39 which is supplied to the saturating amplifier 41. The output of the saturating amplifier 41 at maximum frequency and full voltage is supplied to the two-phase stator windings of the motor 16.

The motor 16 is of a conventional type, for example, squirrel cage. It operates in the conventional two-phase manner with capacitor coupling provided by the capacitor 24 to produce a nominally circular rotating field to provide a starting torque. The frequency output from the multivibrator 39 controls the output from the saturating amplifier 41 so that the torque produced on the shaft 17 of the motor 16 is controlled by the frequency of the excitation and not by the amplitude of the excitation. Thus, at the start, the saturating amplifier 41 will be driven at a frequency which is substantially higher than the derived synchronous frequency for the motor 16, to produce maximum starting torque.

Application of the maximum frequency full voltage output from the amplifier 41 causes the rotor 18 to begin turning and accelerating towards synchronous speed referenced to the maximum drive frequency from the multivibrator 39. When the flip-flop 43 is in the "1" condition, its output is at a discrete level which can be identified as $E_1$ and when it is in the "0" condition, its output is zero and can be identified as $E_0$. As the rotor begins to pick up speed, the disc 28 is rotated so that pulses are produced by the speed pick-off means 33. However, there will be a large frequency difference between the pulse train $f_w$ produced by the speed pick-off means and the pulse train $f_r$ produced by the tuning fork oscillator so that $f_r$ is substantially greater than $f_w$. Therefore, the flip-flop 43 will still be in the "1" state or in the set condition most of the time and the filtered output will nearly equal $E_1$. The flip-flop 43 actually switches each time a pulse arrives. Thus, when a pulse arrives from the reference pulse train $f_w$, the flip-flop 43 will be flipped to the "1" state. When a pulse from the pulse train $f_r$ arrives, the flip-flop 43 is flipped to the "0" state. Thus, it can be seen that the proportionate time which the flip-flop 43 is in the "1" state during a period of time is determined by the number of pulses in the reference pulse train $f_r$ in comparison to the number of pulses in the shaft speed pulse train $f_w$. The output from the flip-flop 43 is averaged by the low pass filter which supplies a command signal $E_{fp}$ which means that the error signal is in either frequency or phase and is a command for the system to require the shaft 17 to either speed up or slow down. The rotor winding resistance can be designed such that it would have a very large excess torque available up to nearly synchronous speed for the rotor. The variable frequency multivibrator 39 would be commanded to stay near its maximum frequency until the rotor 18 approached the synchronous speed.

As the synchronous speed is approached, the shaft speed pulse train would have a frequency which is approaching the frequency of the reference pulse train so that the flip-flop 43 would be approaching equal periods of time in the reset condition or the "0" state and the set condition or "1" state. Thus, when $f_w$ is approximately equal to $f_r$, the output from the filter 46 would average about .50 $E_1$ and a correspondingly lower control or command signal $E_{fp}$ is supplied to the multivibrator 39 to decrease the frequency output from the multivibrator and thus the drive provided by the saturating amplifier 41.

When $f_w=f_r$, a point of discontinuity exists because the system converts to a phase detector from a frequency detector when the pulse trains reach exact synchronism. For example, in the case where the pulse trains are of identical frequency, and exactly 180° out of phase with each other, the flip-flop 43 will be in the "0" and "1" states an equal portion of each cycle, and the average output will be exactly 0.50 $E_1$. If, on the other hand, the pulse $f_w$ arrive just after the $f_r$ pulses, the flip-flop 43 will be reset momentarily after each set pulse arrives, and the average (filtered) output will be near zero. If the $f_w$ pulses always arrive just before the $f_r$ pulses, the flip-flop 43 will be in the "1" state most of the time but producing a filtered output nearly equal to $E_1$. These control signals supplied to the variable frequency multivibrator 39 will produce a sawtooth voltage which represents the phase difference between the two waves, which will tend to accelerate the rotor 18 so that it will jump into synchronism and operate in continuous phase lock with the reference pulse train.

Thus, it can be seen that when the rotor speed approaches sufficiently close to synchronous speed, the synchronizing torques will pull the rotor into phase lock, and the output of the detector 36 will stabilize at that value necessary to supply the steady-state drive torque needed to hold synchronous speed. The rotor will now turn at the precise speed which results in pulses from the wheel or disc 28 synchronous with the tuning fork. Since no slippage can occur, the short term and long term speed accuracy is exactly that of the tuning fork.

In steady-state operation, the speed control system is self-corrective for ordinary variations of its operating blocks, in that any variation in drive voltage available or other basic change which would affect the speed in an open-loop mode, will cause the rotor to lag behind or move ahead in phase, modifying the drive frequency to again produce the necessary steady-state torque to maintain synchronous speed. The only component outside the loop is the tuning-fork oscillator, the basic speed reference, and variations of its frequency will, of course, be perfectly reproduced by the speed control system.

The system shown in FIG. 1 operates as a closed loop servo. During the time that the shaft 17 is being brought up to speed, the system acts as a frequency servo which tries to make the output ferquency of the speed pick-off 33 on shaft 17 match the reference frequency from the tuning fork oscillator. This is equivalent to a one-time-constant servo because the torque is acting on a moment of inertia to accelerate it so that it has a velocity equal to the reference. Thus, the system is a velocity matching system until phase lock is approached. When the system jumps into phase lock, it becomes a closed-loop position servo where the phase of the rotor produces a torque proportional to the phase error. Thus, if the rotor were lagging by a certain angle, an accelerating torque would be developed by the system proportional to the angle and conversely, if the shaft were leading the reference by a certain angle, a decelerating torque proportional to the leading angle would be developed. The system thus acts as a total position servo commanding the rotor 18 to operate in a closed loop position matching system where the desired position rotates continuously in space as defined by the reference oscillator 37. During the phase lock condition, the system is a two-time constant servo since the command torque acts on an inertia element to produce a particular position. As is well known to those skilled in the art, a two-time constant servo system is basically unstable, or in other words, has little damping so that there is a need to provide a phase compensating network in the form of the phase-lead network 38 connected to the output of the frequency-and-phase detector 36. The phase-lead network 38 provides stabilization for the closed loop phase lock servo and during turn-on, commands torque cessation and reversal at the proper moment to "catch" the rotor 18 as its speed crosses through synchronous speed. Since the total loop and phase lock mode constitutes a position servo (with a rotating frame of reference) and contains a second order system, velocity damping must be included to stabilize the servo. The phase lead network 38 accomplishes this by adding a rate of change signal to the proportional frequency or phase error signal, thereby producing a torque proportional to the rate of change of the variable.

It should be appreciated that, if desired, the frequency-and-phase detector 36 can be made more complex so that it automatically brings the rotor up to speed in the frequency matching mode without phase sensing, and then switches to the phase detection mode for locking and continuous operation at synchronous speed.

By way of example, a five hole disc 28 can be provided on the output shaft 17 so that with a rotor operating at synchronous speed at 400 revolutions per second, the speed pick-of means 33 would produce 2000 cycles per second. The tuning fork oscillator 37 can then be a 2000 cycle per second tuning fork oscillator which can be readily designed for more resistance to shock and vibration than one for a lower frequency. The variable frequency multivibrator 39 could be constructed to provide a frequency varying from 300 to 500 cycles per second by varying the charging voltage to the timing capacitors of the multivibrator supplied from the frequency-and-phase detector 36.

Figure 3:
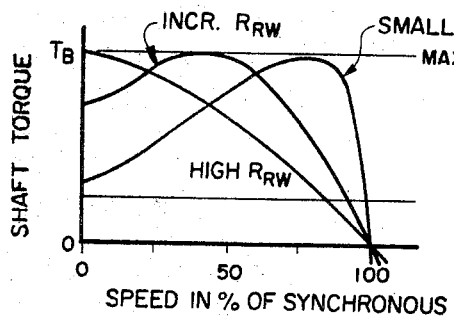
FIGS. 3, 4, 5 and 6 show various speed torque curves for the motor utilized in the system shown in FIG. 1.
Figure 4:
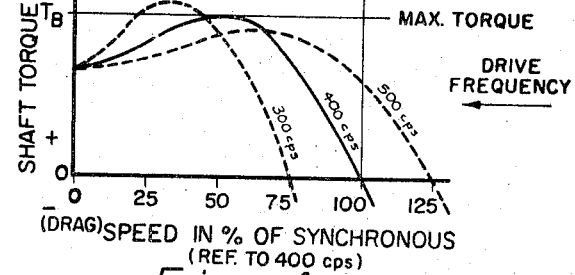

The utilization of a squirrel cage motor for the motor 16 is desirable because there is then no necessity to use slip rings. This is particularly advantageous for very small motors as, for example, small gyro motors. As is well known to those skilled in the art, a squirrel cage motor can be designed with a variety of speed-torque curves depending upon the resistance value of the winding and, as shown in the graph in FIG. 3 in which the resistance of the rotor winding is identified as $R_{rw}$. For very small motors as, for example, small gyro motors where efficiency is not one of the most important considerations, it is desirable to sacrifice some efficiency through use of a higher than normal rotor winding resistance so that the maximum torque, $T_b$, will be obtained at near 50 percent of synchronous speed. This would provide a maximum of excess torque during the entire run-up from a starting condition to synchronism and thus would provide the shortest possible run-up time. Such a value of winding resistance would also provide a good control of thrust and drag torque through variations of the drive frequency as can be seen from FIG. 4. From FIG. 4, it can be seen that control torques of approximately ±50 percent of maximum torque will be caused by the frequency variations of the motor drive from 300 cycles per second to 500 cycles per second. If this were made to correspond, by system gain adjustment, to ±180° of phase error, the drag torques caused by bearings and windage could vary widely without causing the rotor to slip out of synchronism.

Figure 5:
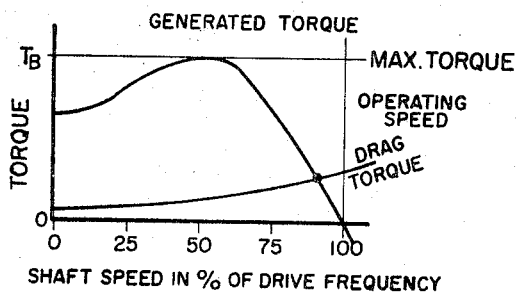
Figure 6:
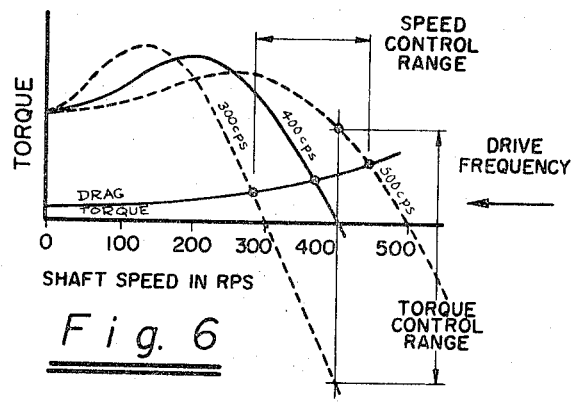

Without the control servo but with a given input frequency drive, the motor will accelerate to, and stabilize at, the rotation speed where the drag torque versus speed line intersects the generated shaft torque versus speed curve as can be seen from FIG. 5. Using actual shaft speed in revolutions per second and showing curves for other drive frequencies, the range over which speed can be controlled can be found. As shown in FIG. 6, it can be seen that for symmetrical control at 400 cycles per second, a higher range of drive frequency should be used, i.e., shifted slightly upward from 300–500 cycles per second to allow equal plus and minus corrective torques to be commanded. However, selection of the value of the rotor winding resistance would affect this choice, due to the changed shape of the torque speed curve which would result.

Figure 7:
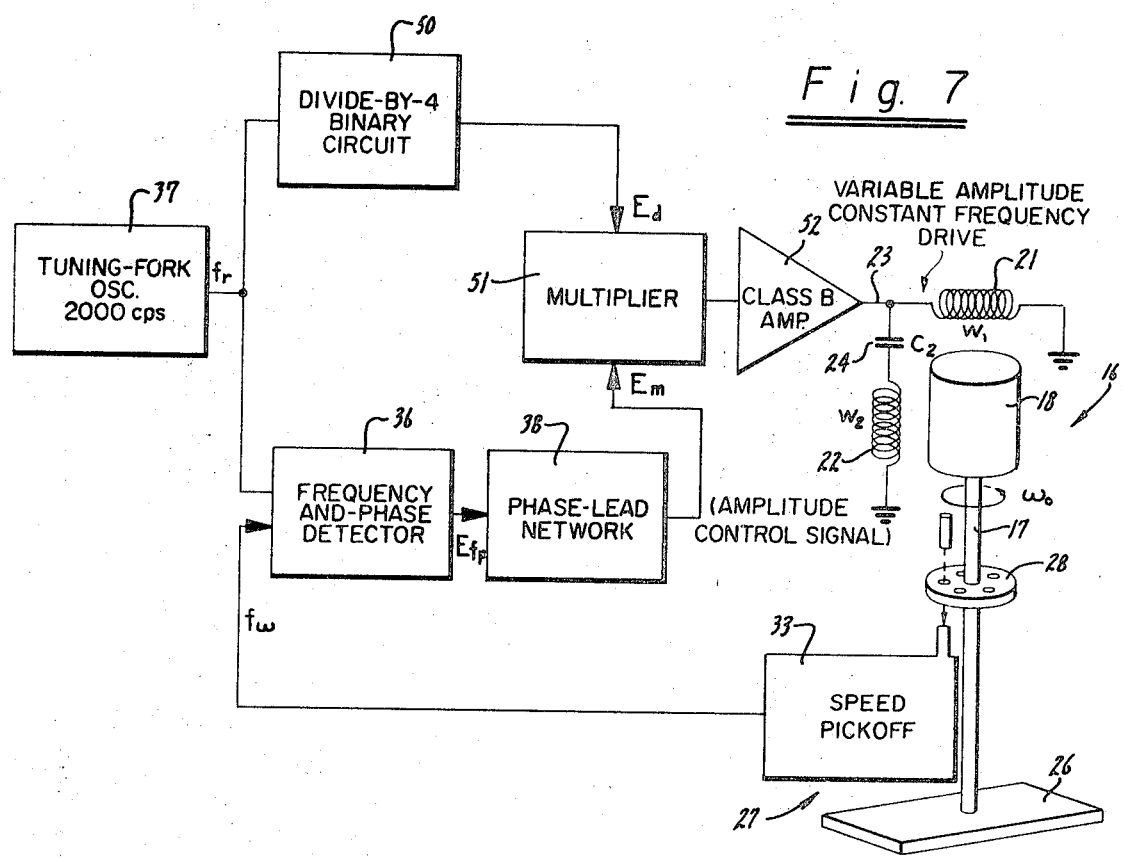
FIG. 7 is a block diagram similar to the block diagram shown in FIG. 1 but utilizing amplitude control of a fixed frequency motor drive.

Another embodiment of the apparatus and system for providing a method of speed control incorporating the present invention is shown in FIG. 7 utilizing amplitude control of a fixed frequency drive. The motor 16 is of the type hereinbefore described in conjunction with FIG. 1. Many other parts of the system are substantially identical as can be seen by comparison of FIGS. 1 and 7. However, the reference pulse train from the oscillator 37, in addition to being supplied to the frequency and phase detector 36, is supplied to a binary circuit 50 which, by way of example, can be a divide-by-four binary circuit. The output of the binary circuit is a squarewave signal which is identified as $E_d$ and is supplied to the input of a multiplier 51. The output of the phase lead network 38 supplies its signal $E_m$ to another input of the multiplier 51. The output of the multiplier 51 is supplied to an amplifier 52 of a suitable type as, for example, a class B amplifier. The output of the amplifier is supplied to the windings carried by the stator of the motor 16.

Operation of the apparatus and system shown in FIG. 7 for performing the method incorporating the present invention can now be briefly described as follows. The binary circuit 50 produces a stable squarewave $E_d$ driving signal which has a frequency above the synchronous frequency which, in effect, overdrives the rotor 18 in frequency. This squarewave is varied in amplitude by the control signal $E_m$ supplied to the multiplier 51 and is supplied to the amplifier 52 to drive the stator windings of the motor 16. The motor 16 locks into synchronism in the same manner as described for the system shown in FIG. 1.

With a 2000 c.p.s. output from the oscillator and utilizing a 5-hole disc 28 and a divide-by-four binary circuit, the rotor 18 is driven by a frequency 5/4 that of the desired shaft speed, and the torque is varied by controlling the amplitude of the stator excitation with the frequency of the drive being held constant. As long as the frequency is above the synchronous frequency, the system will permit the servo loop to control the amplitude of the drive signal and keep the rotor in step or synchronism.

Figure 8:
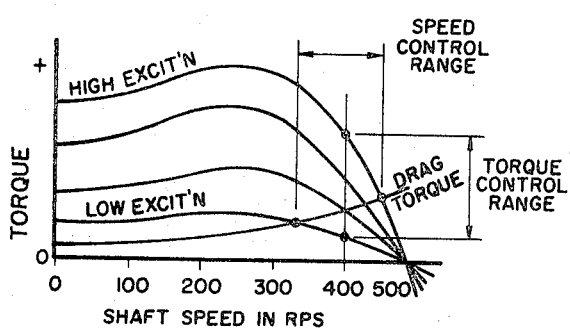
FIG. 8 is a graph showing speed torque curves for the motor utilized in the system shown in FIG. 2.

The torque-speed curves for the system shown in FIG. 7 yield a considerably smaller range of control torques than the system shown in FIG. 1 since reverse (decelerating) torques cannot be commanded in the system shown in FIG. 7. As indicated in FIG. 8, the excitation to the stator windings must be removed to obtain maximum deceleration of the rotor, caused by the drag torques present, as opposed to the system shown in FIG. 1, where large decelerations could be commanded by lowering the drive frequency below the frequency of shaft rotation.

Figure 9:
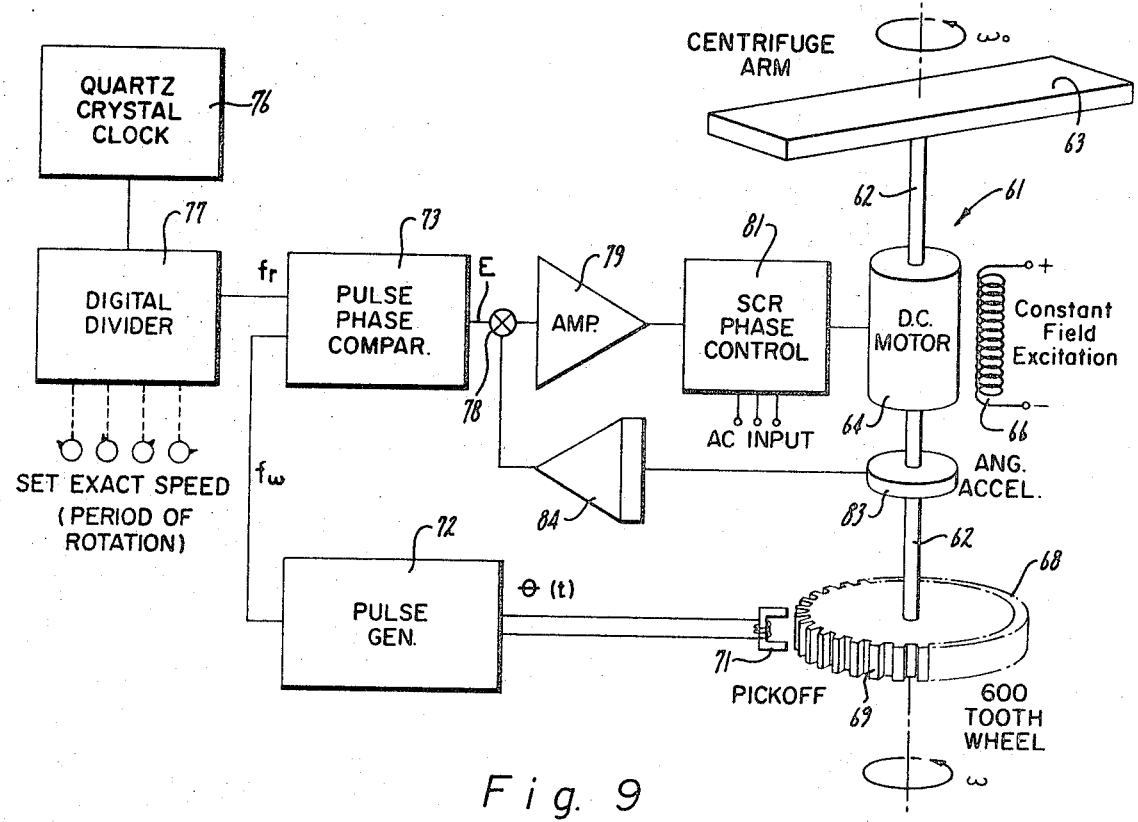
FIG. 9 is a block diagram, partially schematic, of another apparatus and system incorporating the present invention utilized for controlling a centrifuge.

Another embodiment of the apparatus and system utilizing the method incorporating the present invention is shown in FIG. 9 and is particularly utilized for controlling the speed of a centrifuge. As shown in FIG. 9, the system and apparatus consists of a motor 61 in the form of a D-C motor which has a rotating shaft 62. The load carried by the shaft is in the form of a centrifuge arm 63 affixed directly to the shaft. The centrifuge arm 63 is in the form of a flat plate which is rotated in a horizontal plane about an axis which is coincident with the axis of the shaft 62. The motor 61 is provided with a rotor 64 which is mounted on the shaft 62 and which carries a power winding (not shown). The motor also includes an excitation winding 66 which is provided with a D-C excitation from a D-C power supply (not shown).

Means is provided for sensing the speed of the shaft 62 and for producing an integer number of pulses for each revolution of the shaft as in the previous embodiments. In the embodiment shown in FIG. 9, this means takes the form of a precision ground toothed wheel 68 which can be provided with an desired number of teeth as, for example, 600 teeth. Stationary pick-off means is provided for sensing each of the teeth as they pass by the same and to produce a D-C square wave for each tooth 69 of the toothed wheel 68. The pick-off means consists of an inductive pick-off 71 which extends in a generally vertical plane and in the same plane as the teeth 69 extend. The pick-off 71 produces a signal for each tooth 69 as it passes the pick-off 71. This signal is supplied to a pulse generator 72 of a conventional type which produces a series of output pulses, one for each tooth 69, as the tooth passes the pick-off 71 so that there is provided a shaft speed pulse train having an integer number of pulses for each revolution of the shaft.

The pulse generator 72 can utilize electronics similar to that disclosed in U.S. Letters Patent 3,074,279. With such electronics, as the teeth pass the pick-off, the amplitude of the oscillator is sharply modulated. This modulation is detected and used to drive a simple D-C amplifier providing a squarewave output independent of the rate at which the teeth pass by. The squarewave output then drives the Schmitt trigger to produce fast pulses, one for each tooth which passes the pick-off 71. The Schmitt trigger acts to produce a pulse at the same point on each tooth. The pulse train $f_w$ from the pulse generator 72 is supplied to a pulse phase comparator 73. The reference pulse train $f_r$ is also supplied to the pulse phase comparator 73 from a clock or oscillator 76 and a digital divider 77.

Since great precision in the turning rate for the centrifuge arm 63 is desired, it is desirable that the clock or oscillator 76 be as precise as possible. Thus, for example, it can be a crystal controlled oscillator which is oven stabilized to maintain an accuracy of, for example, as great as 0.0001 percent. The digital divider 77 consists of a preset counter which is capable of being preset in less than one clock time which, for example, may be 1.25 microseconds combined with an automatic preset circuit. By way of example, twelve binaries can be utilized in the digital divider 77 which are preset to the dialed number whenever the count reaches zero. By way of example, with a number 1440 set in the dials (using octal code), the counter is preset to 800 pulses. The counter then counts down as each pulse from oscillator 76 reaches it until after 800 pulses, the count reaches zero and the counter is again preset to the original number. Thus, in the example given, a pulse output would be generated at intervals of precisely 800×1.25 microseconds, or every 1000 microseconds, yielding a pulse train with a frequency of 1000 pulses per second. Since the period of the pulse train is always a multiple of the clock time, i.e., of 1.25 microseconds, and since 600 pulses represent a complete revolution of the centrifuge arm 63, the period of the centrifuge would be an exact multiple of 750 microseconds and the dial setting will represent the value of the multiple. In the example given, the period would be 0.600 seconds and the corresponding shaft speed to the dial setting of 1440 would be 100.000 r.p.m.

The output E of the pulse phase comparator 73 is supplied to an adder 78 which is connected to an amplifier 79. The output of the amplifier 79 is connected to a phase control unit 81, the output of which is connected to the winding carried by the rotor 64 of the D-C motor 61 through slip rings (not shown).

The pulse phase comparator 73 accepts the shaft speed pulse train and the reference pulse train as inputs in which the reference pulse train $f_r$ serves as the commanded rate and the shaft speed pulse train $f_w$ represents the actual rate and produces a D-C control signal E which represents the instantaneous phase error between the reference pulses and the fast shaft speed pulses. This servo loop is very similar to the servo loops hereinbefore described and acts as a position servo in that the error signal is proportional to instantaneous position deviation of the centrifuge arm 63 from the commanded position.

As hereinbefore explained, such a servo position loop is basically unstable and has no damping except for that associated with the friction in the D-C motor and the air damping of the air drag acting on the centrifuge arm 63. An inertial damping loop is provided for this purpose.

The inertial damping loop consists of a very sensitive angular accelerometer which is mounted on the rotating shaft 62. This angular accelerometer can be of the type described in copending application Ser. No. 531,457, filed Mar. 3, 1966, and also produced commercially as Systron Donner Model No. 4590 Fluid-Rotor Angular Accelerometer which produces an output signal of 10 volts D-C per radian per second squared with a bandwidth of 30 cycles per second. The output of the angular accelerometer is integrated by an operational amplifier integrator which produces a velocity damping signal with the scale factor of 200 volts per radian per second which is supplied to the adder 78.

From the foregoing, it can be seen that drive and speed control for the centrifuge is developed from two control loops comprising a pulse phase comparison loop and an inertial damping loop. The basic drive command for the D-C motor 61 is provided by summing the loop inputs in the high gain stabilized D-C amplifier 79 which controls the phase of the 60 cycle synchronous firing pulses to a controlled rectifier power amplifier forming a part of the SCR phase control 81. The gain of this motor control system is such that it permits proportional control of the motor 61 by a low power command signal.

The angular accelerometer 83 through the operational amplifier integrator 84 supplies an excellent velocity damping signal which is fed back into the control amplifier 79 to damp the entire system against variations from an inertially constant angular velocity. Thus, the angular velocity damping loop is used for maintaining constant inertial rate. The phase comparison loop maintains the shaft rotation in precise synchronism with the commanded or reference pulse train from the crystal clock 76. The pulse phase comparison loop provides digital accuracy. This loop compares, on a pulse by pulse basis, the phase of a constant amplitude squarewave output pulse train from the pulse generator 72 with the reference pulses being derived by digitally dividing the output frequency of the crystal clock 76.

The inertial damping loop utilizes the integrated output of a high sensitivity angular accelerometer to provide a control signal which represents short term error of angular velocity. This loop effectively damps the centrifuge arm with respect to inertial space, overpowering any inconstancy of data from the phase comparison loop. The velocity damping loop is overpowering so as to tie the centrifuge to inertial space so that in the rotating frame of reference, any deviations from this constant angular velocity would be read out as a correction signal which commands the motor to accelerate or decelerate in order to keep the angular velocity precisely constant with respect to the inertial frame of reference. Thus, the damping loop is able to overpower any discrepancies in the as-manufactured tooth spacing of the 600 tooth wheel 68. It is also able to overpower any discrepancies due to the eccentricities of one of the teeth of the wheel 68. The damping of the velocity damping loop is also sufficient to prevent any significant modulation of the speed of the centrifuge arm in the presence of spurious pulses or in the case of lost pulses from the pulse generator 72. Thus, the velocity damping loop is a discriminatory system which, in effect, looks to see that the pulses are regularly appearing at the proper time. Thus, the system is quite independent of interference.

The D-C motor 61 runs with a constant field excitation so that the output torque is proportional to the output of the amplifier 79 into the armature of the D-C motor.

Figure 10:
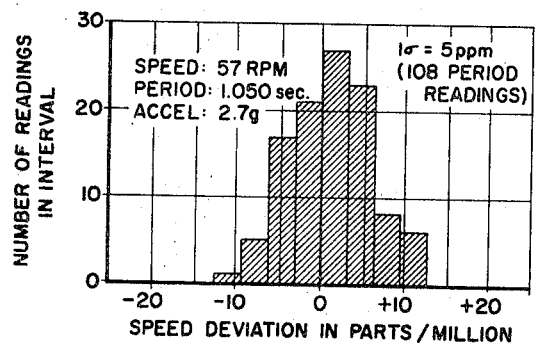
FIGS. 10 and 11 are graphs showing the speed deviations in parts per million with two different speeds of rotation for the centrifuge arm utilized in the system as shown in FIG. 9.
Figure 11:
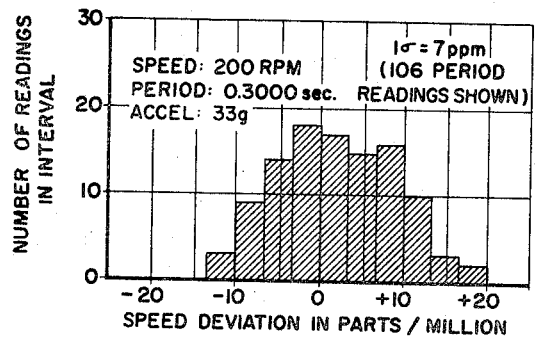

By way of example, a centrifuge using the system and apparatus shown in FIG. 9 was able to bring the wheel inertia of 20 slug-ft.$^2$ from a standing start to a precision stabilized speed of 3.333 revolutions per second in less than 15 seconds. The graphs for two different speeds of operation of this centrifuge are shown in FIGS. 10 and 11. The graphs in FIGS. 10 and 11 give the speed stability plots for the centrifuge operating at 57 r.p.m. and at 200 r.p.m., respectively. In the histogram shown in FIG. 10, 108 period readings were taken. From this histogram, it can be seen that approximately 68 percent of the time the period of rotation of the centrifuge was within 5 microseconds per second of the correct reading. This means that the shaft fluctuations averaged over a much longer period would be much smaller than 5 parts per million. A substantially equivalent performance was also obtained from the centrifuge at a much higher speed as shown in the histogram in FIG. 11.

The centrifuge arm 63 had a radius arm of 36 inches. The wow was less than 0.002 percent and the average speed error as can be seen from the histograms was generally less than 10 parts per million (0.001 percent of value).

From the foregoing, it can be seen that there has been provided an apparatus and system for speed control which is particularly adaptable for precisely controlling the speed of a motor so that it is precisely synchronized with a reference signal through the use of a digital phase lock speed control system of a simplified design. The motor design is much simpler and ordinary squirrel cage induction motors can be utilized, eliminating the need for slip rings. Improved starting and synchronizing torques are produced by the drive system making problems of bearing preload adjustment and drag torque far less significant in manufacture.

We claim:
1. In a speed control system, a motor having a rotating shaft, a rotor carried by the rotating shaft, at least one power winding, at least one excitation winding, one of the windings being carried by the rotor, means for sensing the speed of rotation of the shaft and producing a number of pulses which represents the revolutions of the shaft, means for producing a reference signal comprised of pulses having a repetition rate representing the desired shaft speed, comparison means comparing the pulses representing the speed of the shaft with the pulses representing the desired shaft speed and producing a command signal, and means connected to the power winding and receiving the command signal producing a drive signal proportional to the command signal which represents the difference between the desired shaft speed and the actual shaft speed and means for stabilizing the system when the motor is operating in synchronism, said means for stabilizing the system including an angular accelerometer mounted on the shaft and means for integrating the output of the angular accelerometer and supplying the same to the means for receiving the command signal.

2. A system as in claim 1 wherein said motor is a D-C motor having a constant field excitation supplied to the excitation winding.

3. A system as in claim 1 together with a centrifuge arm mounted on the shaft of the motor and driven by the motor and wherein the means for sensing the speed of the shaft includes a wheel connected to the shaft and means for sensing the speed of rotation of the wheel.

4. A system as in claim 1 wherein said means for producing a reference signal comprises a precision oscillator, and means for digitally dividing the output of the oscillator and supplying it as a reference signal.

5. In a method for speed control of a motor of the type having a rotating shaft, a rotor carried by the rotating shaft, at least one power winding and at least one excitation winding, one of the windings being carried by the rotor, the steps of sensing the speed of rotation of the shaft and producing pulses representing the speed of rotation of the shaft, producing a reference signal comprised of pulses having a repetition rate representing the desired shaft speed, comparing the pulse train representing the speed of rotation of the shaft with the pulse train representing the desired shaft speed, producing a command signal and utilizing the command signal to produce a drive signal for the power winding of the machine which represents the difference between the desired shaft speed and the actual shaft speed to cause the shaft to rotate in synchronism with the reference signal, sensing the angular acceleration of the shaft and taking the integral of the sensed information and modifying the command signal therewith to stabilize the system.

References Cited

UNITED STATES PATENTS

| | | | |
|---|---|---|---|
| 2,493,593 | 1/1950 | Peterson | 318—20.425 |
| 3,241,027 | 3/1966 | Albright | 318—20.425 |
| 3,246,580 | 4/1966 | Huska | 73—516X |
| 2,783,426 | 2/1957 | Pittman | 318—314X |
| 2,803,792 | 8/1957 | Turner | 318—314X |
| 3,008,075 | 11/1961 | Scott | 318—318X |
| 3,041,518 | 6/1962 | Blomqvist et al. | 318—20.435X |
| 3,164,769 | 1/1965 | Anderson | 318—318X |
| 3,258,669 | 6/1966 | Krassoievitch | 318—314 |

ORIS L. RADER, Primary Examiner

R. J. HICKEY, Assistant Examiner

U.S. Cl. X.R.

318—318, 20.425